(12) United States Patent
Hirota et al.

(10) Patent No.: US 11,038,230 B2
(45) Date of Patent: Jun. 15, 2021

(54) COMPOSITION, LAMINATE, PACKAGING MATERIAL, BATTERY CASE PACKAGING MATERIAL, AND BATTERY

(71) Applicant: MITSUI CHEMICALS, INC., Tokyo (JP)

(72) Inventors: Yoshihito Hirota, Chiba (JP); Yuichi Itou, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 95 days.

(21) Appl. No.: 16/069,371

(22) PCT Filed: Jan. 18, 2017

(86) PCT No.: PCT/JP2017/001465
§ 371 (c)(1),
(2) Date: Jul. 11, 2018

(87) PCT Pub. No.: WO2017/126520
PCT Pub. Date: Jul. 27, 2017

(65) Prior Publication Data
US 2019/0036090 A1    Jan. 31, 2019

(30) Foreign Application Priority Data
Jan. 21, 2016 (JP) .............................. JP2016-009746

(51) Int. Cl.
*H01M 50/183* (2021.01)
*C08F 8/00* (2006.01)
(Continued)

(52) U.S. Cl.
CPC ........... *H01M 50/183* (2021.01); *B32B 27/18* (2013.01); *B32B 27/32* (2013.01); *C08F 8/00* (2013.01);
(Continued)

(58) Field of Classification Search
CPC ........ H01M 2/08; H01M 2/02; H01M 2/0287; H01M 50/183; H01M 50/10;
(Continued)

(56) References Cited

U.S. PATENT DOCUMENTS

| 10,236,479 B2 | 3/2019 | Ojiri et al. |
| 10,777,785 B2 | 9/2020 | Ojiri et al. |

(Continued)

FOREIGN PATENT DOCUMENTS

| CN | 104031570 A | 9/2014 |
| CN | 104903416 A | 9/2015 |

(Continued)

OTHER PUBLICATIONS

Extended European Search Report dated Jul. 23, 2019, issued in corresponding application EP17741397.8.
(Continued)

*Primary Examiner* — Gary D Harris
(74) *Attorney, Agent, or Firm* — Rankin, Hill & Clark LLP

(57) ABSTRACT

The present invention relates to a composition, a laminate, a packaging material, a battery case packaging material, and a battery, and the composition includes: a modified olefin polymer (A) that is a modified olefin polymer, the modified olefin polymer being a polymer (a) of a $C_2$ to $C_{20}$ α-olefin modified by a monomer (b) having a functional group reactive with an epoxy group or an oxazoline group; a crosslinking agent (B) including at least one of an epoxy compound and an oxazoline compound; and a catalyst (C) having a pKa of 11 or more, the modified olefin polymer (A) satisfying the following requirements (i) and (ii):
Requirement (i): the polymer (a) contains a structural unit derived from a $C_4$ to $C_{20}$ α-olefin, and
(Continued)

Requirement (ii): a heat of fusion of the polymer (A), as measured according to JIS K7122, is 0 to 50 J/g.

16 Claims, 1 Drawing Sheet

(51) Int. Cl.
|  |  |
|---|---|
| C09J 123/26 | (2006.01) |
| C08F 255/02 | (2006.01) |
| C08F 255/04 | (2006.01) |
| B32B 27/32 | (2006.01) |
| C08G 59/42 | (2006.01) |
| C08L 23/26 | (2006.01) |
| C08L 63/00 | (2006.01) |
| B32B 27/18 | (2006.01) |
| C09J 151/06 | (2006.01) |
| C08L 39/04 | (2006.01) |
| H01M 50/10 | (2021.01) |
| H01M 50/124 | (2021.01) |
| C08F 210/08 | (2006.01) |

(52) U.S. Cl.
CPC ......... *C08F 210/08* (2013.01); *C08F 255/02* (2013.01); *C08F 255/04* (2013.01); *C08G 59/42* (2013.01); *C08L 23/26* (2013.01); *C08L 39/04* (2013.01); *C08L 63/00* (2013.01); *C09J 123/26* (2013.01); *C09J 151/06* (2013.01); *H01M 50/10* (2021.01); *H01M 50/124* (2021.01)

(58) Field of Classification Search
CPC ... H01M 50/124; C08F 255/02; C08F 255/04; C08F 210/08; C08F 8/00; B32B 27/32; B32B 27/18; C08G 59/42; C08L 23/26; C08L 63/00; C08L 39/04; C09J 151/06; C09J 123/26; Y02E 60/10
USPC ........................................................ 429/163
See application file for complete search history.

(56) References Cited

U.S. PATENT DOCUMENTS

| 2006/0276607 A1 | 12/2006 | Ikenaga |
|---|---|---|
| 2008/0292896 A1 | 11/2008 | Ikenaga |
| 2008/0306219 A1 | 12/2008 | Ikenaga |
| 2008/0306234 A1 | 12/2008 | Ikenaga |
| 2008/0312461 A1 | 12/2008 | Ikenaga |
| 2009/0043050 A1 | 2/2009 | Ikenaga |
| 2011/0196103 A1 | 8/2011 | Kawahara |
| 2015/0087769 A1 | 3/2015 | Hirota |
| 2015/0367601 A1* | 12/2015 | Ando ................. B65D 65/40 429/176 |
| 2015/0380692 A1 | 12/2015 | Ojiri et al. |
| 2016/0036013 A1 | 2/2016 | Nakazato |
| 2017/0096586 A1 | 4/2017 | Sakata |
| 2017/0107374 A1 | 4/2017 | Harumashi |
| 2019/0157633 A1 | 5/2019 | Ojiri et al. |

FOREIGN PATENT DOCUMENTS

| CN | 105009322 A | 10/2015 |
|---|---|---|
| EP | 2955212 A1 | 12/2015 |
| JP | 04130169 A * | 5/1992 |
| JP | H04130169 A | 5/1992 |
| JP | 2001-26629 A | 1/2001 |
| JP | 2001057181 A | 2/2001 |
| JP | 3733564 B2 | 1/2006 |
| JP | 2008214555 A | 9/2008 |
| JP | 2009185172 A | 8/2009 |
| JP | 2012216364 A | 11/2012 |
| JP | 5664836 B2 | 2/2015 |
| JP | 2015059198 A | 3/2015 |
| JP | 5700166 B1 | 4/2015 |
| JP | 2015137333 A | 7/2015 |
| WO | 2004087775 A1 | 10/2004 |
| WO | 2013164976 A1 | 11/2013 |
| WO | 2015190411 A1 | 12/2015 |
| WO | 2016002907 A1 | 1/2016 |

OTHER PUBLICATIONS

International Search Report dated Mar. 28, 2017 filed in PCT/JP2017/001465.
Chinese Office Action (CNOA) dated Aug. 28, 2020 issued in corresponding Chinese patent application No. 201780004748.0.
Li et al., Handbook of Modern Adhesive Technology 1st edition, New Age Press, Jan. 31, 2002, pp. 105-107; Cited in CNOA; As a concise explanation of the relevant, Machine translation and the original notification of CNOA included.
Chinese Office Action (CNOA) dated Mar. 19, 2021 issued in the corresponding Chinese Patent Application No. 201780004748.0 and its English machine translation.

* cited by examiner

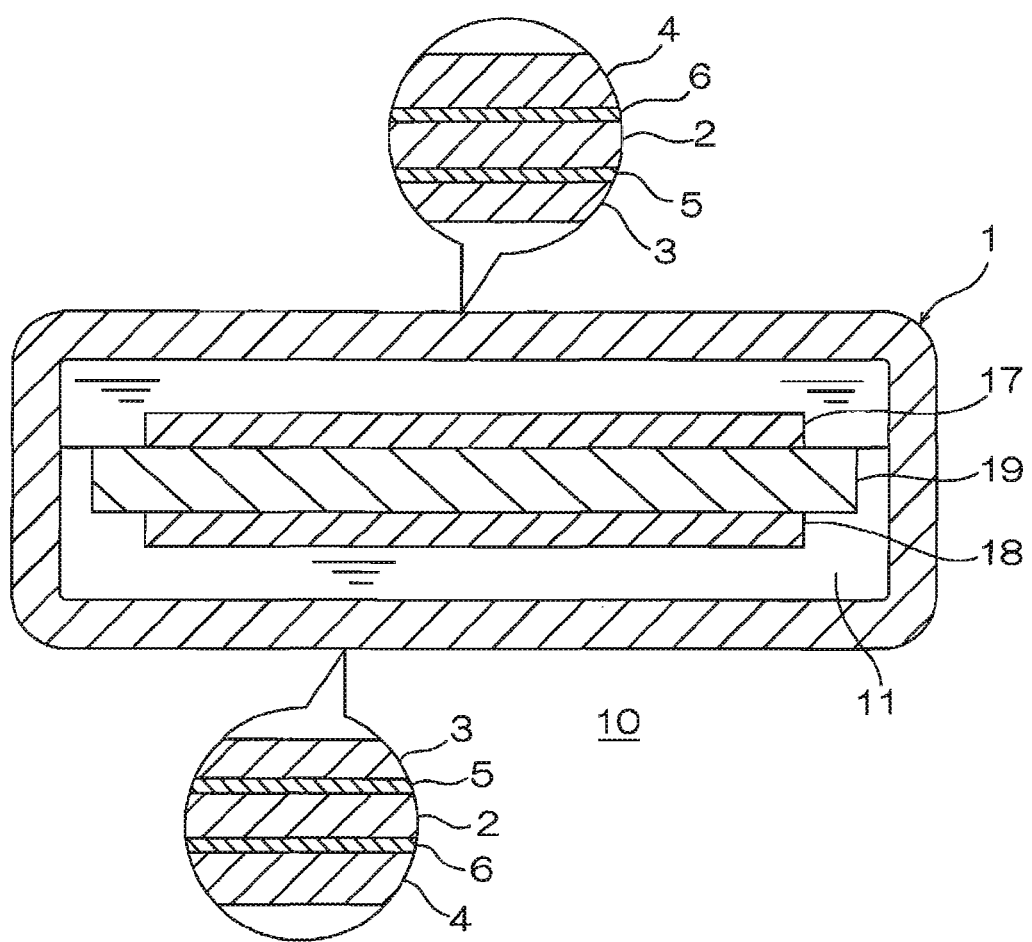

COMPOSITION, LAMINATE, PACKAGING MATERIAL, BATTERY CASE PACKAGING MATERIAL, AND BATTERY

TECHNICAL FIELD

The present invention relates to a composition, a laminate, a packaging material, a battery case packaging material, and a battery.

BACKGROUND ART

It has been conventionally known that a laminate in which an aluminum foil layer serving as a substrate, an adhesive layer, and a film layer (internal layer) bonded as an adherend and made of a thermoplastic resin such as polypropylene are stacked in this order is used as a packaging material for lithium ion secondary batteries (battery case packaging material).

Patent Literatures 1 to 4 describe, as the adhesive layer, a layer obtained from an adhesive containing a modified olefin resin and an epoxy compound or oxazoline compound.

CITATION LIST

Patent Literature

Patent Literature 1: JP-A-2001-57181
Patent Literature 2: JP-A-2012-216364
Patent Literature 3: JP-B-5664836
Patent Literature 4: JP-B-5700166

SUMMARY OF INVENTION

Technical Problem

However, the adhesive layers which are obtained from adhesives described in Patent Literatures 1 to 4 lack sufficient bond strength to a substrate or adherend such as an aluminum foil or polypropylene film. When the adhesive layers are formed at a low temperature, in particular when the adhesives are cured under low-temperature (e.g., 80° C. or lower) aging conditions, the resulting adhesive layers lack sufficient bond strength.

The present invention has been made in view of the above problem, and it is an object of the present invention to provide: a composition capable of forming an adhesive layer with excellent bond strength to a substrate and adherend, in particular a composition capable of forming an adhesive layer with excellent bond strength even under low-temperature aging conditions; and a laminate comprising the adhesive layer.

Solution to Problem

Under such circumstances, the present inventors have conducted intensive studies to solve the above problem and consequently completed the present invention based on the finding that the above object can be achieved by, for example, a composition composed as described below.

Exemplary aspects of the present invention are as follows.

[1] A composition comprising:
a modified olefin polymer (A) that is a modified olefin polymer, the modified olefin polymer being a polymer (a) of a $C_2$ to $C_{20}$ α-olefin modified by a monomer (b) having a functional group reactive with an epoxy group or an oxazoline group;
a crosslinking agent (B) comprising at least one of an epoxy compound and an oxazoline compound; and
a catalyst (C) having a pKa of 11 or more,
the modified olefin polymer (A) satisfying the following requirements (i) and (ii):
Requirement (i): the polymer (a) comprises a structural unit derived from a $C_4$ to $C_{20}$ α-olefin, and
Requirement (ii): a heat of fusion of the modified olefin polymer (A), as measured according to JIS K7122, is 0 to 50 J/g.

[2] The composition according to [1], comprising a hydrocarbon synthetic oil (D) having a kinematic viscosity at 40° C. of 30 to 500,000 cSt.

[3] The composition according to [1] or [2], wherein the polymer (a) comprises a structural unit derived from propylene.

[4] The composition according to [3], wherein a content of the structural unit derived from propylene is 40 to 95 mol % with respect to 100 mol % of a structural unit derived from a $C_2$ to $C_{20}$ α-olefin.

[5] The composition according to [3] or [4], wherein in the polymer (a), all structural units other than the structural unit derived from propylene are structural units derived from a $C_4$ to $C_{20}$ α-olefin.

[6] The composition according to any one of [1] to [5], wherein the $C_4$ to $C_{20}$ α-olefin comprises 1-butene.

[7] The composition according to any one of [1] to [6], wherein a content of a structural unit derived from the monomer (b) is 0.1 to 15 mass % with respect to 100 mass % of the modified olefin polymer (A).

[8] The composition according to any one of [1] to [7], wherein the functional group is a carboxyl group or an acid anhydride group.

[9] The composition according to any one of [1] to [8], wherein the crosslinking agent (B) is at least one selected from a bisphenol A liquid epoxy resin (=bisphenol A-type liquid epoxy resin), an alicyclic epoxy compound, and a trimethylolpropane polyglycidyl ether.

[10] A laminate comprising a substrate and an adhesive layer composed of a cured product of the composition according to any one of [1] to [9].

[11] A packaging material comprising a laminate comprising an internal layer, an adhesive layer, and a substrate in this order,
the adhesive layer being a layer composed of a cured product of the composition according to any one of [1] to [9].

[12] A battery case packaging material, comprising a laminate comprising an internal layer, an inner adhesive layer, a substrate, an outer adhesive layer, and an external layer in this order,
the inner adhesive layer being a layer composed of a cured product of the composition according to any one of [1] to [9].

[13] A battery comprising the battery case packaging material according to [12] and an electrolyte solution packaged by the battery case packaging material, the internal layer of the battery case packaging material being at least partly in contact with the electrolyte solution.

[14] A composition comprising:
a modified olefin polymer (A) that is a modified olefin polymer resulting from modification of a polymer (a) of a $C_2$ to $C_{20}$ α-olefin by a monomer (b1) having a functional group reactive with an epoxy group; and
at least one crosslinking agent (B1) selected from a bisphenol A liquid epoxy resin, an alicyclic epoxy compound, and a trimethylolpropane polyglycidyl ether, the modified olefin polymer (A) satisfying the following requirements (i) and (ii):

Requirement (i): the polymer (a) comprises a structural unit derived from a $C_4$ to $C_{20}$ α-olefin, and Requirement (ii): a heat of fusion of the polymer (A), as measured according to JIS K7122, is 0 to 50 J/g.

[15] The composition according to [14], comprising a hydrocarbon synthetic oil (D) having a kinematic viscosity at 40° C. of 30 to 500,000 cSt.

[16] A laminate comprising a substrate and an adhesive layer composed of a cured product of the composition according to [14] or [15].

Advantageous Effects of Invention

According to an embodiment of the present invention, an adhesive layer having excellent bond strength and chemical resistance (electrolyte solution resistance) can be obtained and, in particular, an aluminum foil layer and a film layer made of a thermoplastic resin such as polypropylene can be strongly bonded together.

In addition, according to an embodiment of the present invention, an adhesive layer having excellent bond strength can easily be formed even under low-temperature aging conditions, and a laminate, a packaging material, a battery case packaging material and the like that have excellent durability and are sufficiently resistant to reduction in bond strength can easily be formed, for example, by dry lamination.

BRIEF DESCRIPTION OF DRAWING

FIG. 1 is a schematic cross-sectional view of an embodiment of the battery according to the present invention.

DESCRIPTION OF EMBODIMENTS

1. Composition

The composition according to an embodiment of the present invention (hereinafter also referred to as "the present composition") is a composition comprising: a modified olefin polymer (A) that is a modified olefin polymer resulting from modification of a polymer (a) of a $C_2$ to $C_{20}$ α-olefin by a monomer (b) having a functional group reactive with an epoxy group or an oxazoline group, the modified olefin polymer (A) satisfying the following requirements (i) and (ii); a crosslinking agent (B) comprising at least one of an epoxy compound and an oxazoline compound; and a catalyst (C) having a pKa of 11 or more (hereinafter also referred to as "the present composition 1"), or a composition comprising: a modified olefin polymer (A) that is a modified olefin polymer resulting from modification of a polymer (a) of a $C_2$ to $C_{20}$ α-olefin by a monomer (b1) having a functional group reactive with an epoxy group, the modified olefin polymer (A) satisfying the following requirements (i) and (ii); and at least one crosslinking agent (B1) selected from a bisphenol A liquid epoxy resin, an alicyclic epoxy compound, and a trimethylolpropane polyglycidyl ether (hereinafter also referred to as "the present composition 2").

Requirement (i): The polymer (a) of a $C_2$ to $C_{20}$ α-olefin contains a structural unit derived from a $C_4$ to $C_{20}$ α-olefin.

Requirement (ii): A heat of fusion of the polymer (A), as measured according to JIS K7122, is 0 to 50 J/g.

1.1 Modified Olefin Polymer (A)

The polymer (A) satisfies the requirements (i) and (ii), and is a polymer (a) of a $C_2$ to $C_{20}$ α-olefin modified by a monomer (b) having a functional group reactive with an epoxy group or an oxazoline group or by a monomer (b1) having a functional group reactive with an epoxy group.

With the use of such a polymer (A), an adhesive layer having excellent bond strength and chemical resistance (electrolyte solution resistance) can be obtained.

One polymer (A) may be used alone, or two or more polymers (A) may be used.

1.1.1 Polymer (a) of $C_2$ to $C_{20}$ α-Olefin

The polymer (a) is not particularly limited as long as it contains a structural unit derived from a $C_4$ to $C_{20}$ α-olefin. The polymer (a) may be a polymer composed of a $C_4$ to $C_{20}$ α-olefin, may be a copolymer obtained using a $C_4$ to $C_{20}$ α-olefin and a $C_2$ to $C_3$ α-olefin, or may, if desired, be a polymer containing a structural unit derived from an unsaturated monomer other than α-olefins (hereinafter also referred to as "the other unsaturated monomer").

When the polymer (a) has no structural unit derived from $C_4$ to $C_{20}$ α-olefin, the long-term stability of a composition containing this polymer and a solvent deteriorates, and it becomes difficult to achieve both high bond strength and high chemical resistance.

One α-olefin alone or two or more α-olefins may be used as a starting material for the polymer (a). Namely, the polymer (a) may be a homopolymer or a copolymer of a $C_4$ to $C_{20}$ α-olefin, or a copolymer (a1) of one or more $C_4$ to $C_{20}$ α-olefins and one or more $C_2$ to $C_3$ α-olefins.

Examples of the copolymers include random copolymers and block copolymers, and random copolymers are preferred.

Examples of the $C_4$ to $C_{20}$ α-olefin include linear or branched α-olefins such as 1-butene, 1-pentene, 1-hexene, 4-methyl-1-pentene, 1-octene, 1-decene, 1-dodecene, 1-tetradecene, 1-hexadecene, 1-octadecene, and 1-eicosene.

From the viewpoint of obtaining a polymer having excellent solubility in solvents, excellent strength and the like, the $C_4$ to $C_{20}$ α-olefin is preferably a $C_4$ to $C_{10}$ linear olefin and more preferably a $C_4$ to $C_6$ linear olefin. From the viewpoint of obtaining a polymer particularly superior in the above properties and the like, the $C_4$ to $C_{20}$ α-olefin more preferably comprises 1-butene and is particularly preferably 1-butene.

Examples of the $C_2$ to $C_3$ α-olefin include ethylene and propylene. From the viewpoint of obtaining a polymer having excellent solubility in solvents, excellent strength and the like, the $C_2$ to $C_3$ α-olefin preferably comprises propylene and is particularly preferably propylene.

Examples of the other unsaturated monomer include: conjugated polyenes such as butadiene and isoprene; and non-conjugated polyenes such as 1,4-hexadiene, 1,7-octadiene, dicyclopentadiene, 5-ethylidene-2-norbornene, 5-vinyl-2-norbornene, 5-methylene-2-norbornene, and 2,5-norbornadiene.

From the viewpoint of obtaining a polymer having excellent solubility in solvents, excellent strength and the like, the polymer (a) is preferably the copolymer (a1) and more preferably a copolymer of propylene and a $C_4$ to $C_{20}$ α-olefin. In particular, the polymer (a) is more preferably a copolymer in which all structural units other than the structural unit derived from propylene are structural units derived from a $C_4$ to $C_{20}$ α-olefin. The $C_4$ to $C_{20}$ α-olefin even more preferably comprises 1-butene, and the polymer (a) is particularly preferably a copolymer of 1-butene and propylene.

In the polymer (a), the content of a structural unit derived from a $C_4$ to $C_{20}$ α-olefin is, for example, 5 mol % or more, preferably 10 mol % or more, and more preferably 20 mol % or more and is, for example, 100 mol % or less, preferably 60 mol % or less, more preferably 50 mol % or less, even more preferably 40 mol % or less, and particularly preferably 35 mol % or less, with respect to 100 mol % of a structural unit derived from a $C_2$ to $C_{20}$ α-olefin, preferably with respect to 100 mol % of total structural units constituting the polymer (a).

When the content of the structural unit derived from the $C_4$ to $C_{20}$ α-olefin meets the condition for the upper limit, a polymer having superior strength can be obtained. When the condition for the lower limit is met, a polymer having superior solubility in solvents can be obtained.

In the polymer (a), the content of a structural unit derived from a $C_2$ to $C_3$ α-olefin (preferably propylene) is preferably 40 mol % or more, more preferably 50 mol % or more, even more preferably 60 mol % or more, and particularly preferably 65 mol % or more and is preferably 95 mol % or less, more preferably 90 mol % or less, and even more preferably 80 mol % or less, with respect to 100 mol % of a structural unit derived from a $C_2$ to $C_{20}$ α-olefin, preferably with respect to 100 mol % of total structural units constituting the polymer (a).

When the content of the structural unit derived from the $C_2$ to $C_3$ α-olefin meets the condition for the upper limit, the melting point (Tm) and the heat of fusion (ΔH) of the copolymer can be lowered. When the condition for the lower limit is met, a polymer having superior strength can be obtained.

The polymer (a) can be obtained by polymerizing a $C_2$ to $C_{20}$ α-olefin in the presence of a known catalyst, such as a solid Ti catalyst or a metallocene catalyst, which is commonly used in production of α-olefin polymers. An example of the metallocene catalyst is a catalyst containing a metallocene compound such as rac-dimethylsilylene-bis{1-(2-methyl-4-phenylindenyl)}zirconium dichloride, an organic aluminum oxy compound such as methylaluminoxane, and an organic aluminum compound such as triisobutylaluminum. More specifically, the polymer (a) can be obtained, for example, by a method described in WO 2004/87775.

The weight-average molecular weight (Mw) of the polymer (a), as determined by gel permeation chromatography (GPC) on a standard polystyrene basis, is preferably $1 \times 10^4$ or more and preferably $1 \times 10^7$ or less. The molecular weight distribution (Mw/Mn) is preferably 1 or more and preferably 3 or less.

When the Mw and Mw/Mn meet the conditions for the lower limits, an adhesive layer having sufficiently high strength can be obtained, and good bond strength can be achieved between the adhesive layer and a substrate or adherend. When the conditions for the upper limits are met, a polymer having good solubility in solvents can be obtained, and a composition less prone to solidification and precipitation can be obtained.

In the present invention, Mw and Mw/Mn can be specifically measured by the methods described in Examples below.

The melting point (Tm) of the polymer (a) is preferably lower than 120° C. and more preferably lower than 100° C.

When the Tm is in this range, an adhesive layer having excellent bond strength can be obtained even if the adhesive layer is formed from the present composition under low-temperature aging conditions.

In the present invention, Tm is determined by differential scanning calorimetry (DSC) according to JIS K7122. Specifically, in a process consisting of heating from 30° C. to 180° C. at 10° C./min, holding at 180° C. for 3 minutes, cooling to 0° C. at 10° C./min, holding at 0° C. for 3 minutes, and heating for a second time to 150° C. at 10° C./min, Tm is determined from a thermogram obtained in the second heating according to JIS K7122.

The heat of fusion (ΔH) of the polymer (a) is preferably 0 J/g or more, more preferably 3 J/g or more, and particularly preferably 5 J/g or more and is preferably 50 J/g or less and more preferably 40 J/g or less.

When the ΔH meets the condition for the upper limit, an adhesive layer having excellent bond strength can be obtained even if the adhesive layer is formed from the present composition under low-temperature aging conditions. When the condition for the lower limit is met, an adhesive layer having excellent strength can be obtained.

In the present invention, ΔH is determined by differential scanning calorimetry (DSC) according to JIS K7122. Specifically, ΔH is calculated from a peak area of a thermogram obtained in a heating process at 10° C./min. More specifically, the measurement is preceded by heating to 180° C. at 10° C./min, holding at 180° C. for 3 minutes, cooling to 0° C. at 10° C./min, and holding at 0° C. for 3 minutes to cancel the heat history made before the measurement, and then ΔH is measured.

1.1.2 Monomer (b) Having Functional Group Reactive with Epoxy Group or Oxazoline Group and Monomer (b1) Having Functional Group Reactive with Epoxy Group The monomer (b) is not particularly limited as long as it has a functional group reactive with an epoxy group or an oxazoline group, and the monomer (b1) is not particularly limited as long as it has a functional group reactive with an epoxy group. Hitherto-known compounds can be used as the monomers (b) and (b1).

Examples of the functional group reactive with an epoxy group or an oxazoline group include groups having active hydrogen, and specific examples include a hydroxyl group, an amino group, a carboxyl group, an acid anhydride group, an ester group, and a thiol group. Examples of the functional group reactive with an epoxy group include groups having active hydrogen, and specific examples include a hydroxyl group, an amino group, a carboxyl group, an acid anhydride group, an ester group, and a thiol group.

The monomers (b) and (b1) may each have one reactive functional group or two or more reactive functional groups.

Preferred as the monomers (b) and (b1) are monomers (b) and (b1) having an acid anhydride group or a carboxyl group from the viewpoints of: achieving efficient reaction in the formation of an adhesive layer to increase the affinity of the polymer (A) to a substrate (e.g., an aluminum foil) or adherend (e.g., a film made of a thermoplastic resin such as polypropylene) and thereby enabling to further enhance the bond strength between the adhesive layer and the substrate or adherend; increasing the chemical resistance and electrolyte solution resistance of the resulting adhesive layer and the like.

Examples of the monomers (b) and (b1) include a hydroxyl group-containing unsaturated compound, an amino group-containing unsaturated compound, an unsaturated carboxylic acid, an unsaturated carboxylic acid anhydride, a vinyl ester compound, a thiol group-containing unsaturated compound, and a derivative thereof.

Examples of the hydroxyl group-containing unsaturated compound include: hydroxyl group-containing (meth) acrylic acid esters such as hydroxyethyl (meth)acrylate, 2-hydroxypropyl (meth)acrylate, 3-hydroxypropyl (meth)acrylate, 2-hydroxy-3-phenoxy-propyl (meth)acrylate, 3-chloro-2-hydroxypropyl (meth)acrylate, glycerin mono (meth)acrylate, pentaerythritol mono(meth)acrylate, trimethylolpropane mono(meth)acrylate, tetramethylolmethane mono(meth)acrylate, butanediol mono(meth)acrylate, polyethylene glycol mono(meth)acrylate, 2-(6-hydrohexanoyloxy)ethyl acrylate, and 2-(meth)acryloyloxyethyl acid phosphate; 10-undecen-1-ol; 1-octen-3-ol; 2-methanol norbornene; hydroxystyrene; N-methylol acrylamide; glycerin monoallyl ether; allyl alcohol; allyloxyethanol; 2-butene-1, 4-diol; and glycerin monoalcohol.

Examples of the amino group-containing unsaturated compound include a vinyl monomer having at least one amino group represented by —$NHR^1$ or a substituted amino group.

The $R^1$ is a hydrogen atom, a $C_1$ to $C_{12}$, preferably $C_1$ to $C_8$ alkyl group, or a $C_8$ to $C_{12}$, preferably $C_6$ to $C_9$ cycloalkyl group. The $R^1$ may be a group derived by substituting a part of the alkyl group or cycloalkyl group with a substituent.

Examples of the amino group-containing unsaturated compound include aminomethyl (meth)acrylate, aminoethyl (meth)acrylate, aminopropyl (meth)acrylate, propylaminoethyl (meth)acrylate, dimethylaminoethyl (meth)acrylate, phenylaminomethyl (meth)acrylate, cyclohexylaminoethyl (meth)acrylate, N-vinyldiethylamine, N-acetylvinylamine, (meth)acrylamide, N-methyl(meth)acrylamide, N,N-dimethyl(meth)acrylamide, N,N-dimethylaminopropyl(meth) acrylamide, p-aminohexyl succinimide, and 2-aminoethyl succinimide.

Examples of the unsaturated carboxylic acid include acrylic acid, methacrylic acid, maleic acid, fumaric acid, tetrahydrophthalic acid, itaconic acid, citraconic acid, crotonic acid, isocrotonic acid, norbornene dicarboxylic acid, and bicyclo[2,2,1]hept-2-ene-5,6-dicarboxylic acid.

Examples of the unsaturated carboxylic acid anhydride include maleic anhydride, itaconic anhydride, citraconic anhydride, tetrahydrophthalic anhydride, and bicyclo[2,2,1]hept-2-ene-5,6-dicarboxylic anhydride.

Examples of the vinyl ester compound include vinyl acetate, vinyl propionate, n-vinyl butyrate, vinyl isobutyrate, vinyl pivalate, vinyl caproate, vinyl versatate, vinyl laurate, vinyl stearate, vinyl benzoate, vinyl salicylate, and vinyl cyclohexanecarboxylate.

Examples of the thiol group-containing unsaturated compound include allyl mercaptan, 2-vinylbenzyl mercaptan, 3-vinylbenzyl mercaptan, 4-vinylbenzyl mercaptan, and thiophenol derivatives such as vinyl thiophenol.

Examples of the derivative include malenyl chloride, malenyl imide, dimethyl maleate, monomethyl maleate, diethyl maleate, diethyl fumarate, dimethyl itaconate, diethyl citraconate, dimethyl tetrahydrophthalate, and dimethyl bicyclo[2,2,1]hept-2-ene-5,6-dicarboxylate.

Preferred as the monomers (b) and (b1) are unsaturated carboxylic acids and unsaturated carboxylic acid anhydrides, more preferred are unsaturated carboxylic acid anhydrides, and even more preferred is maleic anhydride, from the viewpoints of: achieving efficient reaction in the formation of an adhesive layer to increase the affinity of the polymer (A) to a substrate or adherend and thereby enabling to further enhance the bond strength between the adhesive layer and the substrate or adherend; increasing the chemical resistance and electrolyte solution resistance of the resulting adhesive layer and the like.

1.1.3 Synthesis of Modified Olefin Polymer (A)

The method for synthesizing the polymer (A) is not particularly limited. A $C_2$ to $C_{20}$ α-olefin and the monomer (b) or (b1) may be allowed to undergo polymerization reaction. Preferably, the monomer (b) or (b1) and the polymer (a) are reacted. Specific examples include the following methods (1) to (4).

(1) A method comprising dissolving the polymer (a) in a solvent, adding the monomer (b) or (b1) and a radical polymerization initiator, and performing heating and stirring to react the polymer (a) with the monomer (b) or (b1).

(2) A method comprising melting the polymer (a) by heating, adding the monomer (b) or (b1) and a radical polymerization initiator to the resulting melt, and performing stirring to react the polymer (a) with the monomer (b) or (b1).

(3) A method comprising mixing the polymer (a), the monomer (b) or (b1), and a radical polymerization initiator, feeding the resulting mixture to an extruder, and kneading the mixture under heating to react the polymer (a) with the monomer (b) or (b1).

(4) A method comprising immersing the polymer (a) in a solution of the monomer (b) or (b1) and a radical polymerization initiator dissolved in an organic solvent, and then heating the solution to a temperature not causing dissolution of the polymer (a) to react the polymer (a) with the monomer (b) or (b1).

The polymer (a), monomer (b), and monomer (b1) used in the above reaction may each consist of one polymer or monomer, or may each comprise two or more polymers or monomers.

In the reaction, a monomer devoid of the functional group described above may be used together with the monomer (b) or (b1). From the viewpoints of obtaining a polymer (A) capable of efficient reaction with a crosslinking agent (B), and of increasing the chemical resistance and electrolyte solution resistance of the resulting adhesive layer, it is preferable not to use any monomer devoid of the functional group described above.

The blending ratio of the monomer (b) or (b1) is preferably such that the content of a structural unit derived from the monomer (b) or (b1) is in the following range. Namely, the content of the structural unit derived from the monomer (b) or (b1) is preferably 0.1 mass % or more and more preferably 0.5 mass % or more and is preferably 15 mass % or less and more preferably 12 mass % or less, with respect to 100 mass % of the total amount of the polymer (a) and the monomers (b) and (b1).

When the content of the structural unit derived from the monomer (b) or (b1) is in the above range, efficient reaction can be achieved in the formation of an adhesive layer to increase the affinity of the polymer (A) to a substrate or adherend and thereby the bond strength between the adhesive layer and the substrate or adherend can be further enhanced; and the chemical resistance and electrolyte solution resistance of the resulting adhesive layer can be increased.

For the above reaction, the reaction temperature is, for example, 50° C. or higher and preferably 80° C. or higher and is, for example, 300° C. or lower, and the reaction time is, for example, about 1 minute to 10 hours.

The process employed for the reaction may be a batch process or a continuous process. A batch process is preferred to accomplish the modification reaction homogeneously.

Examples of the radical polymerization initiator include an organic peroxide and an organic perester.

Examples of the organic peroxide include dicumyl peroxide, benzoyl peroxide, dichlorobenzoyl peroxide, di-tert-butyl peroxide, 2,5-dimethyl-2,5-di(peroxybenzoate) hexyne-3, 1,4-bis(tert-butylperoxyisopropyl)benzene, lauroyl peroxide, 2,5-dimethyl-2,5-di(tert-butylperoxy)hexyne-3, and 2,5-dimethyl-2,5-di(tert-butylperoxy)hexane.

Examples of the organic perester include tert-butyl peracetate, tert-butyl perphenylacetate, tert-butyl perisobutyrate, tert-butyl per-sec-octoate, tert-butyl perpivalate, cumyl perpivalate, tert-butyl perdiethylacetate, and tert-butyl peroxybenzoate.

Furthermore, the radical polymerization initiator may be another kind of initiator, examples of which include azo compounds such as azobisisobutyronitrile and dimethyl azoisobutyronitrile.

Among the radical polymerization initiators, organic peroxides are preferred, and more preferred are dicumyl peroxide, di-tert-butyl peroxide, 2,5-dimethyl-2,5-di(tert-butylperoxy)hexyne-3, 2,5-dimethyl-2,5-di(tert-butylperoxy)hexane, 1,4-bis(tert-butylperoxyisopropyl)benzene and the like.

The blending ratio of the radical polymerization initiator is, for example, 0.001 parts by mass or more and 10 parts by mass or less with respect to 100 parts by mass of the polymer (a).

The synthesis of the polymer (A) may be carried out in the presence of one or more solvents.

Examples of the solvents include: aromatic hydrocarbons such as benzene, toluene, and xylene; aliphatic hydrocarbons such as hexane, heptane, octane, and decane; alicyclic hydrocarbons such as cyclohexane, cyclohexene, and methylcyclohexane; alcohols such as methanol, ethanol, isopropyl alcohol, butanol, pentanol, hexanol, propanediol, and phenol; ketones such as acetone, methyl isobutyl ketone, methyl ethyl ketone, pentanone, hexanone, isophorone, acetophenone, and cyclohexanone; cellosolves such as methyl cellosolve and ethyl cellosolve; esters such as methyl acetate, ethyl acetate, butyl acetate, methyl propionate, and butyl formate; and halogenated hydrocarbons such as trichloroethylene, dichloroethylene, and chlorobenzene. Preferred among these are aromatic hydrocarbons, aliphatic hydrocarbons, a mixed solvent of an aliphatic hydrocarbon and a ketone, and a mixed solvent of an aliphatic hydrocarbon and an ester.

When the polymer (A) is synthesized in the presence of a solvent, the resulting solution containing the polymer (A) (varnish) may be used as it is in preparation of the present composition, or the polymer (A) extracted from the varnish may be used in preparation of the present composition.

1.1.4 Properties Etc. Of Modified Olefin Polymer (A)

The Mw of the polymer (A), as determined by GPC on a standard polystyrene basis, is preferably $1 \times 10^4$ or more, more preferably $2 \times 10^4$ or more, and particularly preferably $3 \times 10^4$ or more and is preferably $1 \times 10^7$ or less, more preferably $1 \times 10^6$ or less, and particularly preferably $5 \times 10^5$ or less.

When the Mw of the polymer (A) meets the condition for the lower limit, an adhesive layer having sufficiently high strength and having excellent bond strength to a substrate or adherend can be obtained. When the condition for the upper limit is met, a polymer (A) having good solubility in solvents and less prone to solidification and precipitation can be obtained. In particular, when the Mw of the polymer (A) is $5 \times 10^5$ or less, an adhesive layer having excellent bond strength to a substrate or adherend can be obtained.

The Mw/Mn of the polymer (A) is preferably 1 or more and more preferably 1.5 or more and is preferably 3 or less and more preferably 2.5 or less.

When the Mw/Mn meets the condition for the lower limit, a polymer (A) having good solubility in solvents and less prone to solidification and precipitation can be obtained.

When the condition for the upper limit is met, an adhesive layer having sufficiently high strength and having excellent bond strength to a substrate or adherend can be obtained.

The Tm of the polymer (A) is preferably lower than 120° C., more preferably lower than 100° C., even more preferably 90° C. or lower, and particularly preferably 85° C. or lower and is preferably 40° C. or higher and more preferably 50° C. or higher.

When the Tm of the polymer (A) meets the condition for the upper limit, reduction in the bond strength of an adhesive layer can be prevented even if the adhesive layer is formed from the present composition under low-temperature aging conditions. When the condition for the lower limit is met, an adhesive layer having excellent strength and durability can be obtained.

A polymer (A) having such Tm as specified above can be obtained, for example, by controlling the content of a structural unit derived from a $C_2$ to $C_3$ α-olefin in the polymer (A) to the range described above and by meeting the requirement (i).

The ΔH of the polymer (A) is 0 J/g or more, preferably 3 J/g or more, and more preferably 5 J/g or more and is 50 J/g or less, preferably 40 J/g or less, and more preferably 35 J/g or less.

When the ΔH of the polymer (A) meets the condition for the upper limit, an adhesive layer having excellent bond strength can be obtained even if the adhesive layer is formed from the present composition under low-temperature aging conditions. When the condition for the lower limit is met, an adhesive layer having excellent strength can be obtained.

If the ΔH of the polymer (A) is more than 50 J/g, the resulting polymer (A) will have poor solubility in solvents and will be prone to solidification and precipitation.

A polymer (A) having such ΔH as specified above can be obtained, for example, by controlling the content of a structural unit derived from a $C_2$ to $C_3$ α-olefin in the polymer (A) to the range described above and by meeting the requirement (i).

The crystallization half-time at 50° C. of the polymer (A) is preferably 100 seconds or more, more preferably 150 seconds or more, and even more preferably 200 seconds or more. The crystallization half-time is intended to include the case where no substantial crystallization occurs or the case where the value of the crystallization half-time is too great to determine, namely the case where the crystallization half-time is infinite.

When the crystallization half-time of the polymer (A) meets the condition for the lower limit, the polymer (A) can react with the crosslinking agent (B) while or after entering valleys between the surface asperities of a substrate or adherend, thus providing an anchoring effect leading to further enhancement of the bond strength of the resulting adhesive layer.

The crystallization half-time can be determined by isothermal crystallization measurement using a differential scanning calorimeter, specifically by the method described in Examples below.

The kinematic viscosity at 40° C. of the polymer (A) is preferably more than 500,000 cSt. The cases where the kinematic viscosity is more than 500,000 cSt include the case where measurement of the kinematic viscosity is impossible due to low flowability.

In the present invention, the kinematic viscosity at 40° C. is measured according to ASTM D 445.

The content of a structural unit derived from the monomer (b) or (b1) (degree of modification) in the polymer (A) is preferably 0.1 mass % or more and more preferably 0.5 mass % or more and is preferably 15 mass % or less, more preferably 10 mass % or less, even more preferably 5 mass % or less, particularly preferably 4 mass % or less, and still even more preferably 2 mass % or less, with respect to 100 mass % of the modified olefin polymer (A).

When the degree of modification is in the above range, efficient reaction of the polymer (A) can be achieved in the formation of an adhesive layer to increase the affinity of the polymer (A) to a substrate or adherend and thereby the bond strength between the adhesive layer and the substrate or adherend can be further enhanced; and the chemical resistance and electrolyte solution resistance of the resulting adhesive layer can be increased.

The degree of modification in the present invention can be measured by 1H-NMR, specifically under the following conditions.

That is, the model ECX 400 nuclear magnetic resonance spectrometer (manufactured by JEOL Ltd.) is used, the solvent is deuterated ortho-dichlorobenzene, the sample concentration is 20 mg/0.6 mL, the measurement temperature is 120° C., the observed nucleus is $^1$H (400 MHz), the sequence is a single pulse sequence, the pulse width is 5.12p seconds (45° pulse), the repetition time is 7.0 seconds, and the cumulative number is 500 or more.

For the chemical shift reference, a peak attributed to hydrogen of tetramethylsilane is set to 0 ppm. The same result can be obtained also when, for example, a peak attributed to residual hydrogen of deuterated ortho-dichlorobenzene is set to 7.10 ppm.

$^1$H peaks etc. attributed to the monomer (b) or (b1) can be assigned by a common technique.

When an unsaturated carboxylic acid or acid anhydride is used as the monomer (b) or (b1), for example, the acid value may be used as an index indicating the amount of the functional group introduced into the polymer (A).

In this case, the acid value of the polymer (A) is preferably 0.1 mgKOH/g or more and more preferably 0.5 mgKOH/g or more and is preferably 100 mgKOH/g or less, more preferably 30 mgKOH/g or less, and particularly preferably 10 mgKOH/g or less.

When the acid value is in the above range, efficient reaction of the polymer (A) can be achieved in the formation of an adhesive layer to increase the affinity of the polymer (A) to a substrate or adherend and thereby the bond strength between the adhesive layer and the substrate or adherend can be further enhanced; and the chemical resistance and electrolyte solution resistance of the resulting adhesive layer can be increased.

The method for measuring the acid value may be the following method according to JIS K-2501-2003.

About 10 g of the polymer (A) is accurately weighed and placed into a 200-mL tall beaker. A volume of 150 mL of a mixed solvent prepared by mixing xylene and dimethylformamide in a volume ratio of 1:1 is added as a titration solvent into the beaker. Several drops of a 1 w/v % ethanol solution of phenolphthalein (manufactured by Wako Pure Chemical Industries, Ltd.) are added as an indicator, and the liquid temperature is increased to 80° C. to dissolve the polymer (A). After the liquid temperature becomes constant at 80° C., titration is conducted using a 0.1 mol/L 2-propanol solution of potassium hydroxide (manufactured by Wako Pure Chemical Industries, Ltd.), and the acid value is determined from the titer.

Specifically, the acid value can be calculated by the equation shown below. In the present invention, the acid value is an average of values determined by three repetitions of the titration.

$$\text{Acid value(mgKOH/g)} = (EP1-BL1) \times FA1 \times C1/SIZE$$

In this equation, "EP1" represents the titer (mL), "BL1" represents the blank value (mL), "FA1" represents the factor of the titrant (1.00), "C1" represents the concentration equivalent (5.611 mg/mL: equivalent to the amount of potassium hydroxide in 1 mL of 0.1 mol/L 2-propanol solution of KOH), and "SIZE" represents the amount (g) of the polymer (A) sampled.

The blending ratio of the polymer (A) is preferably 50 mass % or more and more preferably 60 mass % or more and is preferably 99 mass % or less and more preferably 95 mass % or less, with respect to 100 mass % of non-volatile components (components other than the solvent) of the present composition.

When the blending ratio of the polymer (A) is in the above range, an adhesive layer having excellent bond strength and chemical resistance (electrolyte solution resistance) can be obtained.

1.2 Crosslinking Agents (B) and (B1)

For the present composition 1, a crosslinking agent (B) comprising at least one of an epoxy compound and an oxazoline compound is used, while for the present composition 2, at least one crosslinking agent (B1) selected from a bisphenol A liquid epoxy resin, an alicyclic epoxy compound, and a trimethylolpropane polyglycidyl ether is used. The crosslinking agent (B) is a compound different from the polymer (A).

For the present composition 1, the polymer (A) and catalyst (C) are used together with the crosslinking agent (B); thus, a composition that experiences little change in volume during curing and that can be cured at low temperatures can be obtained and, in particular, an adhesive layer having excellent bond strength can be obtained. For the present composition 2, the crosslinking agent (B1) is used as the crosslinking agent (B); thus, a composition exhibiting the above effect can be obtained without the use of the catalyst (C).

The epoxy compound is a crosslinkable compound having two or more epoxy groups per molecule. Examples of such an epoxy compound include: bisphenol epoxy resins such as a bisphenol A epoxy resin (different from a hydrogenated bisphenol A epoxy resin) and a bisphenol F epoxy resin; hydrogenated bisphenol epoxy resins; novolac epoxy resins; biphenyl epoxy resins; stilbene epoxy resins; hydroquinone epoxy resins; naphthalene skeleton epoxy resins; tetraphenylol ethane epoxy resins; tris(hydroxyphenyl)methane epoxy resins; dicyclopentadiene phenol epoxy resins; alicyclic epoxy resins such as 3',4'-epoxycyclohexylmethyl-3,4-epoxycyclohexane carboxylate and 1,2-epoxy-4-(2-oxiranyl)cyclohexane adduct of 2,2-bis(hydroxymethyl)-1-butanol; polyglycidyl esters of polybasic acids such as diglycidyl ester of hexahydrophthalic anhydride; glycidyl ethers such as sorbitol polyglycidyl ether, sorbitan polyglycidyl ether, pentaerythritol polyglycidyl ether, trimethylolpropane polyglycidyl ether, polypropylene glycol diglycidyl ether, diglycerol polyglycidyl ether, glycerol polyglycidyl ether, hexanediol diglycidyl ether, hydrogenated bisphenol A diglycidyl ether, and cyclohexanedimethanol diglycidyl ether; diene polymer epoxy resins such as polybutadiene and polyisoprene; glycidylamine epoxy resins such as tetraglycidyl diaminodiphenylmethane, tetraglycidyl bis(aminomethyl)cyclohexane, diglycidylaniline, and tetraglycidyl m-xylylenediamine; and epoxy resins having a hetero ring such as triazine and hydantoin.

Among the above epoxy compounds, a bisphenol A liquid epoxy resin, alicyclic epoxy compound, and trimethylolpropane polyglycidyl ether are preferred from the viewpoint of, for example, obtaining an adhesive layer having superior bond strength, in particular an adhesive layer capable of more strongly bonding an aluminum foil layer to a film layer made of a thermoplastic resin such as polypropylene.

The bisphenol A liquid epoxy resin is not particularly limited as long as the resin is a liquid at ordinary temperature (25° C.), and a commercially-available product may be used.

Examples of the commercially-available product include: EPICLON 840, 840-S, 850, 850-S, EXA-850CRP, and 850-LC (manufactured by DIC Corporation); jER 828EL and 827 (manufactured by Mitsubishi Chemical Corporation); and EPOMIK R-140P (manufactured by Mitsui Chemicals, Inc.).

The alicyclic epoxy compound refers to a compound having at least one epoxycycloalkyl group or epoxycycloalkenyl group in the molecule or a compound having in the molecule at least one group in which at least one epoxy group is linked to an alicyclic ring via a single bond.

Examples of the alicyclic epoxy compound include 3,4-epoxycyclohexenylmethyl-3',4'-epoxycyclohexene carboxylate, 3',4'-epoxycyclohexylmethyl-3,4-epoxycyclohexane carboxylate, 3,4-epoxycyclohexyloctyl-3,4-epoxycyclohexane carboxylate, 2-(3,4-epoxycyclohexyl-5,5-spiro-3,4-epoxy)cyclohexane-m-dioxane, bis(3,4-epoxycyclohexylmethyl) adipate, vinylcyclohexene dioxide, bis(3,4-epoxy-6-methylcyclohexylmethyl) adipate, 3,4-epoxy-6-methylcyclohexyl-3,4-epoxy-6-methylcyclohexanecarboxylate, methylenebis(3,4-epoxycyclohexane), dicyclopentadiene diepoxide, ethylene glycol di(3,4-epoxycyclohexylmethyl) ether, ethylenebis(3,4-epoxycyclohexane carboxylate), 1,2,8,9-diepoxylimonene, 1,2-epoxy-4-(2-oxiranyl)cyclohexane adduct of 2,2-bis(hydroxymethyl)-1-butanol, and compounds as described in JP-A-2008-214555.

The alicyclic epoxy compound used may be a commercially-available product, and examples of the commercially-available product include Celloxide 2021P, EHPE3150, EHPE3150CE, and Epolead GT401 (all of which are manufactured by Daicel Corporation).

From the viewpoint of obtaining an adhesive layer having superior bond strength and the like, the alicyclic epoxy compound is preferably 1,2-epoxy-4-(2-oxiranyl)cyclohexane adduct of 2,2-bis(hydroxymethyl)-1-butanol.

Examples of the trimethylolpropane polyglycidyl ether include trimethylolpropane diglycidyl ether, trimethylolpropane triglycidyl ether, and a mixture thereof.

The trimethylolpropane polyglycidyl ether used may be a commercially-available product, and examples of the commercially-available product include EX-321L (manufactured by Nagase ChemteX Corporation).

The oxazoline compound is a cross-linkable compound having two or more oxazoline groups per molecule. Examples of such an oxazoline compound include oxazoline group-containing polymers such as a polymer of an oxazoline group-containing monomer and a copolymer of an oxazoline group-containing monomer and another monomer.

Examples of the oxazoline group-containing monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-ethyl-2-oxazoline, 2-isopropenyl-2-oxazoline, and 2-isopropenyl-4,4-dimethyl-2-oxazoline. These may be used singly, or two or more.

Examples of the other monomer include: alkyl (meth)acrylates (the alkyl group has about 1 to 14 carbon atoms); unsaturated carboxylic acids such as acrylic acid, methacrylic acid, itaconic acid, maleic acid, fumaric acid, crotonic acid, styrenesulfonic acid, and salts thereof (such as sodium salts, potassium salts, ammonium salts, and tertiary amine salts); unsaturated nitriles such as acrylonitrile and methacrylonitrile; unsaturated amides such as (meth)acrylamide, N-alkyl(meth)acrylamide, and N,N-dialkyl(meth)acrylamide (examples of the alkyl group include methyl, ethyl, n-propyl, isopropyl, n-butyl, isobutyl, t-butyl, 2-ethylhexyl, and cyclohexyl groups); vinyl esters such as vinyl acetate and vinyl propionate; vinyl ethers such as methyl vinyl ether and ethyl vinyl ether; α-olefins such as ethylene and propylene; halogenated α,β-unsaturated monomers such as vinyl chloride, vinylidene chloride, and vinyl fluoride; and α,β-unsaturated aromatic monomers such as styrene and α-methylstyrene. These may be used singly, or two or more.

From the viewpoint of, for example, obtaining an adhesive layer having superior bond strength, the oxazoline compound is preferably an oxazoline compound comprising 2-isopropenyl-2-oxazoline. Examples of commercially-available products include "EPOCROS" series manufactured by NIPPON SHOKUBAI CO., LTD.

The epoxy equivalent weight of the epoxy compound and the oxazoline equivalent weight of the oxazoline compound are preferably 100 g/eq or more and more preferably 125 g/eq or more and are preferably 1,600 g/eq or less and more preferably 500 g/eq or less, from the viewpoint of obtaining an adhesive layer having superior bond strength, chemical resistance, and electrolyte solution resistance.

These equivalent weights can be measured according to JIS K7236.

The blending ratio of the crosslinking agents (B) and (B1) is desirably such that the equivalent weight of the epoxy and oxazoline groups in the crosslinking agents (B) and (B1)/the equivalent weight of the functional group reactive with the epoxy or oxazoline group in the polymer (A) is preferably 0.01 or more and more preferably 0.1 or more and is preferably 50 or less, more preferably 30 or less, even more preferably 20 or less, and particularly preferably 10 or less.

When the blending ratio of the crosslinking agents (B) and (B1) is in the above range, an adhesive layer having superior bond strength, chemical resistance, and electrolyte solution resistance can be obtained.

1.3 Catalyst (C)

For the present composition 1, a catalyst (C) having a pKa of 11 or more is used.

With the use of such a catalyst (C), crosslinking reaction can be efficiently promoted at a low temperature without using the crosslinking agent (B1) as the crosslinking agent (B), and an adhesive layer having excellent chemical resistance and electrolyte solution resistance can be formed. In addition, an adhesive layer having excellent bond strength, in particular an adhesive layer capable of strongly bonding an aluminum foil layer to a film layer made of a thermoplastic resin such as polypropylene can be obtained.

One catalyst (C) may be used alone, or two or more catalysts (C) may be used.

The catalyst (C) is not particularly limited as long as it is a compound having a pKa of 11 or more. The catalyst (C) is preferably a compound capable of promoting the crosslinking reaction involving the crosslinking agent (B). Examples of such a compound include: strongly basic tertiary amines such as 1,8-diazabicyclo[5.4.0]undecene-7 (DBU) and 1,6-diazabicyclo[3.4.0]nonene-5; and a phosphazene catalyst containing a phosphazene base, and preferred are DBU and a phosphazene catalyst.

The pKa refers to an acid dissociation constant in an aqueous solution at 25° C. For phosphoric acid, for example, there are three types of pKa, namely $pKa_1$, $pKa_2$, and $pKa_3$. The pKa as described in the present invention refers to $pKa_1$, namely the first acid dissociation constant.

The blending ratio of the catalyst (C) is preferably 1 ppm or more and more preferably 100 ppm or more and is preferably 1 mass % or less and more preferably 0.3 mass % or less with respect to 100 mass % of non-volatile components (components other than the solvent) of the present composition.

When the blending ratio of the catalyst (C) is in the above range, a composition having high curing rate can be obtained, and an adhesive layer having excellent chemical resistance, electrolyte solution resistance, and bond strength can be obtained.

1.4 Hydrocarbon Synthetic Oil (D)

From the viewpoint of, for example, obtaining an adhesive layer having high bond strength, the present composition may further comprise a hydrocarbon synthetic oil (D) in addition to the components described above.

One hydrocarbon synthetic oil (D) may be used alone, or two or more hydrocarbon synthetic oils (D) may be used.

Examples of the hydrocarbon synthetic oil (D) include polymers of $C_2$ to $C_{20}$ olefins. Preferred among the polymers are an oligomer obtained by homopolymerization of a $C_2$ to $C_{20}$ olefin and an oligomer obtained by copolymerization of two or more such olefins.

Examples of the $C_2$ to $C_{20}$ olefin include ethylene, propylene, 1-butene, 1-octene, 1-decene, and 1-dodecene.

An ethylene copolymer containing a structural unit derived from ethylene and a structural unit derived from a $C_3$ to $C_{20}$ α-olefin can be suitably used as the hydrocarbon synthetic oil (D). In this case, the amount of the structural unit derived from ethylene is preferably 30 mol % or more and more preferably 40 mol % or more and is preferably 70 mol % or less and more preferably 60 mol % or less with respect to 100 mol % of the total amount of the structural unit derived from ethylene and the structural unit derived from the $C_3$ to $C_{20}$ α-olefin.

The kinematic viscosity at 40° C. of the hydrocarbon synthetic oil (D) is 30 cSt or more, preferably 300 cSt or more, and more preferably 5,000 cSt or more and is 500,000 cSt or less, preferably 400,000 cSt or less, and even more preferably 300,000 cSt or less.

When the kinematic viscosity at 40° C. of the hydrocarbon synthetic oil (D) is in the above range, an adhesive layer having high bond strength can be obtained.

When the hydrocarbon synthetic oil (D) is incorporated in the present composition, the relative proportion of the hydrocarbon synthetic oil (D) is preferably 1 mass % or more and preferably 80 mass % or less with respect to 100 mass % of the total amount of the polymer (A) and the hydrocarbon synthetic oil (D).

When the blending ratio of the hydrocarbon synthetic oil (D) is in the above range, an adhesive layer having excellent strength and bond strength can be obtained.

1.5 Method for Preparing Present Composition

The present composition 1 can be prepared by mixing the polymer (A), the crosslinking agent (B), the catalyst (C), and optionally the hydrocarbon synthetic oil (D), and the present composition 2 can be prepared by mixing the polymer (A), the crosslinking agent (B1), and optionally the hydrocarbon synthetic oil (D).

The following additives other than the components (A) to (D) described above may be incorporated in the present composition to the extent that the effect of the present invention is not impaired: a polymer (a) (unmodified product); a curing catalyst; a leveling agent; an antifoaming agent; an antioxidant; a thermal stabilizer; a light stabilizer such as an ultraviolet absorber; a plasticizer; a surfactant; a pigment such as titanium oxide (rutile type), zinc oxide, or carbon black; a thixotropic agent; a thickener; a tackifier such as rosin resin or terpene resin; a surface conditioner; an antisettling agent; a weathering stabilizer; a pigment dispersant; an antistatic agent; a filler; organic or inorganic fine particles; an antifungal agent; and a silane coupling agent.

Furthermore, from the viewpoint of improvement in processability, the present composition may be a varnish further containing a solvent in addition to the components described above.

Examples of the solvent include those which can be used in synthesis of the polymer (A), and preferred solvents include toluene, a methylcyclohexane/methyl isobutyl ketone mixed solvent, a methylcyclohexane/methyl ethyl ketone mixed solvent, a methylcyclohexane/ethyl acetate mixed solvent, a cyclohexane/methyl ethyl ketone mixed solvent, a cyclohexane/ethyl acetate mixed solvent, and a cellosolve/cyclohexanone mixed solvent. Water can also be used as a dispersion medium.

The solvent is desirably incorporated in such an amount that the content of non-volatile components in 100 mass % of the varnish is, for example, 5 mass % or more and preferably 10 mass % or more and is, for example, 50 mass % or less and preferably 40 mass % or less.

The present composition is suitable for use as an adhesive for dry lamination, a hot-melt adhesive, or a composition for optically transparent double-sided tapes.

2. Laminate

A laminate according to an embodiment of the present invention (hereinafter also referred to as "present laminate") is not particularly limited as long as it comprises a substrate and an adhesive layer composed of a cured product of the present composition described above. The laminate may further comprise another layer.

In the laminate, the adhesive layer may be present on one surface of the substrate or on both surfaces of the substrate and may be present over the whole or a part of the surface(s).

The method for producing the present laminate is not particularly limited, and a hitherto-known method can be employed. Preferred is a method comprising a coating formation step of forming a coating from the present composition on the substrate and an aging step of curing the coating.

All of the steps of the method for producing the present laminate are preferably performed at a low temperature (about 120° C. or lower, preferably 100° C. or lower), from the viewpoints of obtaining a laminate without impairing the properties of the substrate or adherend, of increasing the freedom to select the substrate or adherend and the like. With the use of the present composition, laminate production at such a low temperature can yield a laminate having excellent bond strength and chemical resistance (electrolyte solution resistance).

Preferred methods for the coating formation step include: a method comprising applying the present composition onto a substrate and optionally drying the composition to form a coating; and a method comprising immersing a substrate in the present composition, withdrawing the substrate, and optionally drying the composition to form a coating on the substrate.

The method employed for the application is not particularly limited and can be a hitherto-known method, examples of which include application methods such as die coating, flow coating, spray coating, bar coating, gravure coating, gravure reverse coating, kiss reverse coating, micro-gravure coating, roll coating, blade coating, rod coating, roll doctor coating, air knife coating, comma roll coating, reverse roll coating, transfer roll coating, kiss roll coating, curtain coating, and printing.

The substrate is not particularly limited and may be any substrate on which the adhesive layer is to be formed. Examples of the substrate include: a resin substrate made of a resin, as exemplified by polyolefin such as polyethylene or polypropylene, ABS resin, polycarbonate (PC), polyester resin such as PET, polyphenylene sulfide (PPS), polyamide resin such as nylon, or acrylic resin; a barrier film such as transparent vapor-deposited PET; an inorganic substrate made of an inorganic material such as ED steel plate, Mg alloy, stainless steel (SUS), aluminum, aluminum alloy, or glass; a substrate made of a composite of the resin and inorganic material; and a decorative film. Among these, a metal foil, substrate made of polyolefin, and decorative film are preferred, and an aluminum foil and substrate made of polyolefin are more preferred.

That surface of the substrate which is to be in contact with the adhesive layer may be subjected to a hitherto-known surface treatment such as corona treatment to enhance the bond strength.

Examples of the decorative film include known films having design, and specific examples include: a film prepared by decorating the resin substrate or metal foil mentioned above by printing, painting, vapor deposition or the like; and a laminate of a film having design and the resin substrate or metal foil mentioned above.

Examples of the film having design include a film produced by imparting design to a thermoplastic film such as an acrylic film, PET film, PC film, cyclic olefin copolymer (COC) film, vinyl chloride film, or ABS film.

Design may be imparted by a hitherto-known method to the adhesive layer or coating previously described.

Examples of the method for imparting design (decoration method) include: existing vacuum forming methods such as vacuum forming and pressure vacuum forming; insert molding; in-mold forming; and TOM method employing a "vacuum forming apparatus" described in JP-B-3733564. These methods are capable of imparting design to a laminate having a complicated three-dimensional structure.

The thickness of the substrate is preferably 1 μm or more and more preferably 5 μm or more and is preferably 500 μm or less and more preferably 100 μm or less.

Examples of the method for drying the composition provided on the substrate include: leaving the substrate with the composition at ordinary temperature (about 20° C.) and ordinary pressure; drying the composition at a reduced pressure; and heating the composition. The heating may be performed in one stage or in two or more stages.

The conditions of the heating are not particularly limited as long as volatile components such as the solvent are evaporated under the conditions. In an example, the heating is performed at a temperature which is, for example, 120° C. or lower and preferably 100° C. or lower and is, for example, 40° C. or higher for a period which is, for example, 3 seconds or more and preferably 1 minute or more and is, for example, 1 hour or less.

When the present laminate is used, the adhesive layer is typically bonded to the intended adherend. Namely, the present laminate may be a bonded assembly in which the substrate, adhesive layer, and adherend are stacked in this order.

Examples of the adherend are the same as those mentioned for the substrate.

A method for producing the bonded assembly may be to apply the present composition between the substrate and adherend, optionally perform the drying step, and then perform the aging step. A preferred method is dry lamination in which the composition or coating is brought into contact with the adherend before the drying step or after the coating formation step and then the aging step is performed.

A method for the aging step includes heating the coating. This heating may be performed in one stage or in two or more stages.

The conditions of the heating can be selected as appropriate. Examples of the method include: a method (low-temperature aging) in which the aging is performed at a low temperature which is, for example, 80° C. or lower, preferably 70° C. or lower, and particularly preferably 60° C. or lower and is, for example, 40° C. or higher for a period which is, for example, 1 day or more and preferably 3 days or more and is, for example, 7 days or less; and a method (high-temperature aging) in which the aging is performed at a high temperature which is, for example, 100° C. or higher and preferably 120° C. or higher and is, for example, 200° C. or lower for a period which is, for example, 0.1 seconds or more and preferably 0.5 seconds or more and is, for example, 60 seconds or less. Of these methods, the low-temperature aging is preferred from the viewpoint of obtaining a laminate without impairing the properties of the substrate or adherend, from the viewpoint of increasing the freedom to select the substrate or adherend and the like.

When the substrate and adherend are bonded together, the bonding may be performed while applying a pressure between the substrate and adherend.

The pressure is, for example, 0.1 MPa or more and preferably 0.2 MPa or more and is preferably 2 MPa or less.

The thickness of the adhesive layer is not particularly limited and may be selected as appropriate depending on the intended use. The thickness is, for example, 0.2 μm or more and preferably 1 μm or more and is, for example, 100 μm or less and preferably 20 μm or less.

The laminate described above can be used, for example, in the following: interior and exterior components for automobiles; various front panels such as those for AV devices; surface decorative materials such as buttons and emblems; casings of home information appliances such as mobile phones and cameras; various components such as housings, display windows, and buttons; exterior materials for furniture; building interior materials such as those for bathroom surfaces, wall surfaces, ceilings, and floors; building exterior materials such as siding for exterior walls and other exterior materials for fences, roofs, gates, and bargeboards; interior materials such as those for window frames, doors, rails, doorsills, and head jambs, and surface decorative materials for furniture; optical components such as various displays, lenses, mirrors, goggles, and window panes; interior and exterior components for various vehicles other than automobiles such as trains, aircrafts, and ships; various containers such as bottles, cosmetic containers, and accessory cases; packaging materials; and other various articles.

3. Packaging Material

A packaging material according to an embodiment of the present invention comprises a laminate comprising an internal layer, an adhesive layer, and a substrate that are stacked in this order. The adhesive layer is a layer composed of a cured product of the present composition described above.

By virtue of having the adhesive layer described above, the packaging material has excellent bond strength between the substrate and internal layer and also has excellent chemical resistance and electrolyte solution resistance. Thus, even when the packaging material is used over a long period of time, reduction in bond strength between the substrate and internal layer can be effectively prevented. That is, a packaging material having excellent long-term reliability can be obtained.

The packaging material is not particularly limited as long as the internal layer, adhesive layer, and substrate are stacked in this order. A hitherto-known layer may be provided between the above layers or on the surface of the laminate.

Such a packaging material is suitably used as a battery case packaging material (a packaging material for battery cases) that has excellent bond strength and chemical resistance (electrolyte solution resistance), as a packaging material for highly alkaline solutions that has excellent bond strength and alkali resistance, or as a packaging material for alcohol-containing solutions that has excellent bond strength and alcohol resistance.

The internal layer corresponds to the adherend described above in "2. Laminate", and examples of the internal layer include, but are not limited to, the same layers as those mentioned for the adherend. When the packaging material is used as a packaging material for highly alkaline solutions or a packaging material for alcohol-containing solutions, a thermoplastic polyolefin film such as a non-oriented polypropylene film or a low-density linear polyethylene film is preferably used as the internal layer to impart chemical resistance (electrolyte solution resistance) and heat sealability to the packaging material.

Examples of the substrate include, but are not limited to, the same substrates as those mentioned for the substrate described above in "2. Laminate".

The thickness of the packaging material may be selected as appropriate depending on the intended use and is, for example, 30 µm or more and is, for example, 200 µm or less.

The packaging material may be used in the form of a bag having the internal layer facing inwardly so that the packaged material, such as a highly alkaline solution or alcohol-containing solution, is in contact with the internal layer.

Examples of the highly alkaline solution include solutions having a pH of, for example, 9 or more, preferably 10 or more. Specific examples include alkaline detergents and hair treatment agents.

Examples of the alcohol-containing solutions include solutions containing an alcohol such as methanol, ethanol, propanol, or ethylene glycol. The alcohol concentration in the alcohol-containing solution is, for example, 3 mass % or more and preferably 5 mass % or more and is, for example, 95 mass % or less, and preferably 80 mass % or less.

4. Battery Case Packaging Material

A battery case packaging material according to an embodiment of the present invention comprises a laminate comprising an internal layer, an inner adhesive layer, a substrate, an outer adhesive layer, and an external layer that are stacked in this order. The inner adhesive layer is a layer composed of a cured product of the present composition described above.

By virtue of having the adhesive layer described above, the battery case packaging material has excellent bond strength between the substrate and internal layer and also has excellent electrolyte solution resistance. Thus, even when the battery case packaging material is used over a long period of time, reduction in bond strength between the substrate and internal layer can be effectively prevented. That is, a battery case packaging material that has excellent long-term reliability can be obtained.

The battery case packaging material is not particularly limited as long as the internal layer, inner adhesive layer, substrate, outer adhesive layer, and external layer are stacked in this order. A hitherto-known layer may be provided between the above layers or on the surface of the laminate.

The internal layer corresponds to the adherend described above in "2. Laminate", and examples of the internal layer include, but are not limited to, the same layers as those mentioned for the adherend. It is preferable to use a thermoplastic polyolefin film such as a non-oriented polypropylene film to impart chemical resistance (electrolyte solution resistance) and heat sealability to the battery case packaging material.

Examples of the substrate include, but are not limited to, the same substrates as those mentioned for the substrate described above in "2. Laminate". Preferred as the substrate is a metal foil, and more preferred is an aluminum foil or SUS foil. From the viewpoint of corrosion resistance and so on, the surface of the substrate may be subjected to chemical conversion treatment.

The outer adhesive layer may be any layer that allows bonding between the external layer and substrate and may be a layer composed of a cured product of the present composition described above or a layer obtained using a hitherto-known adhesive such as an adhesive for dry lamination or solventless adhesive.

The external layer is not particularly limited. Preferably, a single-layer film consisting of an oriented or non-oriented polyester, polyamide, or polypropylene film or a multi-layer film composed of two or more such films stacked together is used as the external layer to impart heat resistance required for a heat-sealing step in battery production, formability and pinhole resistance required for forming process, and insulating properties required for commercial distribution.

The thickness of the battery case packaging material is, for example, 60 µm or more and is, for example, 160 µm or less.

5. Battery

A battery according to an embodiment of the present invention comprises the above battery case packaging material and an electrolyte solution packaged by the battery case packaging material, the internal layer of the battery case packaging material being at least partly in contact with the electrolyte solution. Examples of the battery include, but are not limited to, a lithium ion secondary battery.

Hereinafter, the battery will be described with reference to FIG. 1 showing an embodiment of the battery.

As shown in FIG. 1, a battery 10 comprises a battery case packaging material 1 and an electrolyte solution 11 packaged by the battery case packaging material 1. The battery 10 further comprises a positive electrode 17, negative electrode 18, and separator 19 that are enclosed within the battery case packaging material 1.

In this battery, the battery case packaging material 1 is configured in the form of a bag so that the electrolyte solution 11 is in contact with the inner surface of an internal layer 3 of the battery case packaging material 1, and the battery case packaging material 1 is a laminate in which the internal layer 3, an inner adhesive layer 5, a substrate 2, an outer adhesive layer 6, and an external layer 4 are stacked in this order from the inside of the laminate.

Examples of the electrolyte solution 11 include, but are not limited to, an electrolyte solution containing ethylene carbonate, diethyl carbonate, dimethyl carbonate, or a lithium salt such as lithium hexafluorophosphate.

The positive electrode 17 and negative electrode 18 are arranged in contact with the electrolyte solution 11 and opposed across the separator 19 at a distance from each other.

EXAMPLES

Hereinafter, the present invention will be described by examples. The present invention is not limited to these examples.

1. Properties of Polymers

[Contents of Structural Units Derived from Propylene, Ethylene, and 1-Butene]

The contents of structural units derived respectively from propylene, ethylene, and 1-butene in the polymers obtained in the production examples described below were determined using $^{13}$C-NMR.

[Melting Point (Tm) and Heat of Fusion (ΔH)]

The melting point (Tm) and the heat of fusion (ΔH) of the polymers obtained in the production examples described below were determined using a differential scanning calorimeter (DSC-Q1000, manufactured by TA Instruments). The details of the method are as previously described.

[Kinematic Viscosity at 40° C.]

The kinematic viscosity at 40° C. of the polymers obtained in the production examples described below was measured according to ASTM D445.

[Weight-Average Molecular Weight (Mw) and Molecular Weight Distribution (Mw/Mn)]

Weight-average molecular weight (Mw) and molecular weight distribution (dispersion degree) (Mw/Mn) were measured using a gel permeation chromatograph (LC-10 series, manufactured by Shimadzu Corporation) under the conditions listed below. On the basis of the measurement results obtained, the weight-average molecular weight (Mw) and molecular weight distribution (Mw/Mn) of the polymers obtained in the production examples described below were calculated with the aid of a calibration curve created using a monodisperse standard polystyrene.

Detector: C-R4A, manufactured by Shimadzu Corporation
Columns: TSKG 6000H-TSKG 4000H-TSKG 3000H-TSKG 2000H (all of which are manufactured by Tosoh Corporation)
Mobile phase: Tetrahydrofuran
Temperature: 40° C.
Flow rate: 0.8 mL/min

[Degree of Modification]

The content of (degree of modification by) maleic anhydride in the polymers obtained in the production examples described below was determined by measurement using 1H-NMR. The details of the method are as previously described.

[Acid Value]

The acid value of the polymers obtained in the production examples described below was measured according to JIS K-2501-2003. The details of the method are as previously described.

[Crystallization Half-Time of Maleic Anhydride-Modified Propylene/1-Butene Copolymer]

About 5 mg of the polymer obtained in each of the production examples was charged into a dedicated aluminum pan, and subjected to the following procedures using a differential scanning calorimeter (Diamond DSC, manufactured by PerkinElmer, Inc.): heating from 30° C. to 150° C. at 320° C./min, holding at 150° C. for 5 minutes, subsequent cooling to 50° C. at 320° C./min, and analysis of a DSC curve obtained during holding at 50° C. Specifically, the total amount of heat was calculated from the area defined by the DSC curve and a baseline, a time point at which the temperature decreased to 50° C. was used as a reference (t=0), and the time taken until 50% of the calculated total amount of heat was reached was determined as the crystallization half-time.

2. Synthesis of Polymers

Production Example 1: Synthesis of Propylene/1-Butene Copolymer (1)

A 2 L autoclave thoroughly purged with nitrogen was charged with 900 mL of hexane and 75 g of 1-butene, and 1 mmol of triisobutylaluminum was added. This was followed by heating to 70° C. and then by supply of propylene to achieve a total pressure of 7 kg/cm$^2$G. Next, 0.30 mmol of methylaluminoxane and 0.001 mmol of rac-dimethylsilylene-bis{1-(2-methyl-4-phenylindenyl)}zirconium dichloride calculated as Zr atoms were added, and polymerization was allowed to proceed for 30 minutes while the total pressure was maintained at 7 kg/cm$^2$G by continuous supply of propylene. The polymerization was followed by degassing, and a polymer (copolymer (1)) was collected in a large amount of methanol. The polymer was dried under reduced pressure at 110° C. for 12 hours.

For the copolymer (1) obtained, the melting point (Tm) was 84° C., the heat of fusion (ΔH) was 32 J/g, the weight-average molecular weight (Mw) was 330,000, the molecular weight distribution (Mw/Mn) was 2, the content of the structural unit derived from propylene was 78 mol %, and the content of the structural unit derived from 1-butene was 22 mol %.

Production Example 2: Synthesis of Maleic Anhydride-Modified Propylene/1-Butene Copolymer (A-1)

An amount of 3 kg of the copolymer (1) was added to 10 L of toluene, followed by heating to 145° C. under nitrogen atmosphere to dissolve the copolymer (1) in toluene. Furthermore, 382 g of maleic anhydride and 175 g of di-tert-butyl peroxide were supplied to the system under stirring over 4 hours, after which stirring was continued at 145° C. for 2 hours. After cooling, a large amount of acetone was introduced to precipitate a maleic anhydride-modified propylene/1-butene copolymer (A-1), which was collected by filtration, washed with acetone, and then vacuum-dried.

For the copolymer (A-1) obtained, the melting point (Tm) was 84° C., the heat of fusion (ΔH) was 32 J/g, the crystallization half-time at 50° C. was 276 seconds, the weight-average molecular weight (Mw) was 110,000, the molecular weight distribution (Mw/Mn) was 2, the degree of modification by maleic anhydride was 1 mass % with respect to 100 mass % of the copolymer (A-1), and the acid value was 6 mgKOH/g.

Production Example 3: Synthesis of Ethylene/Propylene Copolymer (D-1)

A stirring blade-equipped continuous polymerization reactor thoroughly purged with nitrogen was charged with 1 L of dehydrated and purified hexane, and a hexane solution of ethylaluminum sesquichloride $(Al(C_2H_5)_{1.5}Cl_{1.5})$ adjusted to a concentration of 96 mmol/L was continuously supplied at a rate of 500 mL/h for 1 hour, after which a hexane solution of VO(OC$_2$H$_5$)Cl$_2$ adjusted to a concentration of 16 mmol/l was supplied as a catalyst continuously at 500 mL/h while hexane was also supplied continuously at 500 mL/h. In the meantime, the polymerization solution was continuously withdrawn through the top of the polymerization reactor so that the volume of the polymerization solution in the polymerization reactor was kept constant at 1 L. Next, bubbling tubes were used to supply ethylene gas at a rate of 27 L/h, propylene gas at a rate of 26 L/h, and hydrogen gas at a rate of 100 L/h. The copolymerization reaction was carried out at 35° C. by circulating a refrigerant in a jacket attached to the exterior of the polymerization reactor. The resulting polymer solution was decalcified with hydrochloric acid and then introduced into a large amount of methanol to give a precipitate. After that, the precipitate was dried under reduced pressure at 130° C. for 24 hours. In this manner, an ethylene/propylene copolymer (D-1) was obtained.

For the copolymer (D-1) obtained, the content of the structural unit derived from ethylene was 56 mol %, and the content of the structural unit derived from propylene was 44 mol %. For the copolymer (D-1), the weight-average molecular weight (Mw) was 14,000, the molecular weight distribution (Mw/Mn) was 1.9, and the kinematic viscosity at 40° C. was 37,500 cSt.

Production Example 4: Synthesis of Maleic Anhydride-Modified Propylene/Ethylene Copolymer (A-2)

To 10 L of toluene was added 3 kg of a propylene/ethylene copolymer in which the content of the structural unit derived from propylene was 67 mol % and which had a weight-average molecular weight (Mw) of 330,000, and the system was purged with nitrogen for 1 hour. The temperature of the system was increased to 145° C. to completely dissolve the propylene/ethylene copolymer in toluene. After that, 382 g of maleic anhydride and 175 g of di-tert-butyl peroxide were supplied to the system through separate inlets over 4 hours while the system was continuously stirred. Stirring was further continued as a post-reaction step at 145° C. 2 hours, after which the system was cooled to room temperature. A portion of the cooled reaction solution was collected and introduced into a large amount of acetone to precipitate a maleic anhydride-modified propylene/ethylene copolymer in the form of crumbs (dregs). The precipitate obtained was collected, washed repeatedly with acetone, and then vacuum-dried at ordinary temperature for two days and nights. A purified maleic anhydride-modified propylene/ethylene copolymer (A-2) was thus obtained.

For the copolymer (A-2) obtained, the degree of modification by maleic anhydride was 1.5 mass % with respect to 100 mass % of the copolymer (A-2). The heat of fusion (ΔH) was 1.6 J/g, the weight-average molecular weight (Mw) was 140,000, and the acid value was 9 mgKOH/g.

3. Crosslinking Agents (B) and Catalysts (C)

In Examples and Comparative Examples described below, crosslinking agents (B) listed in Table 1 below and catalysts (C) listed in Table 2 below were used.

TABLE 1

| | Manufacturer | Trade name | Substance name | Epoxy equivalent weight (q/eq) |
|---|---|---|---|---|
| (B-1) | Mitsui Chemicals, Inc. | EPOMIK R-140P | Bisphenol A liquid epoxy resin | 190 |
| (B-2) | Daicel Corporation | Celloxide 2021P | 3',4'-Epoxycyclohexylmethyl-3,4-epoxycyclohexane carboxylate | 137 |
| (B-3) | | EHPE3150 | 1,2-Epoxy-4-(2-oxiranyl)cyclohexane adduct of 2,2-bis(hydroxymethyl)-1-butanol | 177 |
| (B-4) | Nagase ChemteX Corporation | EX-321L | Trimethylolpropane polyglycidyl ether | 130 |
| (B-5) | New Japan Chemical Co., Ltd. | RIKARESIN DME-100 | 1,4-Cyclohexanedimethanol diglycidyl ether | 158 |
| (B-6) | Kyoeisha Chemical Co., Ltd. | Epolight 4000 | Hydrogenated bisphenol A diglycidyl ether | 236 |
| (B-7) | Nagase ChemteX Corporation | EX-920 | Polypropylene glycol diglycidyl ether | 176 |
| (B-8) | | R-45EPT | Polybutadiene-modified epoxy resin | 1570 |

TABLE 2

| | Manufacturer | Trade name | pKa | Substance name |
|---|---|---|---|---|
| (C-1) | Shikoku Chemicals Corporation | 1,2-DMZ | 8.2 | 1,2-Dimethylimidazole |
| (C-2) | Wako Pure Chemical Industries, Ltd. | — | 8.5 | Morpholine |
| (C-3) | | — | 10.4 | Dicyclohexylamine |
| (C-4) | | — | 10.7 | Triethylamine |
| (C-5) | | — | 10.9 | Diethylamine |
| (C-6) | | — | 12 | Diazabicycloundecene |

4. Production of Composite Films (Al Foil/Adhesive Layer/CPP Laminates)

Example 1

An amount of 80 g of the maleic anhydride-modified propylene/1-butene copolymer (A-1) produced in Production Example 2 and 20 g of the ethylene/propylene copolymer (D-1) produced in Production Example 3 were dissolved in 400 g of toluene to prepare a modified olefin polymer varnish (1).

An amount of 49.4 g of the modified olefin polymer varnish (1) thus obtained and 1.3 g of a solution prepared by dissolving 1 g of a crosslinking agent (B-1) in 9 g of ethyl acetate were mixed to prepare an adhesive composition for lamination.

Next, the adhesive composition for lamination was diluted with toluene, and the diluted composition was applied onto the glossy surface of a 40-μm-thick aluminum foil (Al foil, non-surface-treated) at ordinary temperature using a bar coater so that the weight per unit area of the resulting coated foil would be 3.3 g/m$^2$, and the solvent was evaporated to obtain a coated foil. After that, the surface of the coating of the coated foil obtained and the corona-treated surface of a 60-μm-thick non-oriented polypropylene film (CPP, with one surface corona-treated) were placed on each other, and this was followed by aging at 60° C. for 3 days to cure the coating and thereby bond the Al foil and CPP together. A laminate (composite film) comprising the Al foil, adhesive layer, and CPP stacked in this order was thus obtained.

Example 2

A composite film was obtained in the same manner as in Example 1, except for replacing the crosslinking agent (B-1) with a crosslinking agent (B-2).

Example 3

A composite film was obtained in the same manner as in Example 1, except for replacing the crosslinking agent (B-1) with a crosslinking agent (B-3).

Example 4

A composite film was obtained in the same manner as in Example 1, except for replacing the crosslinking agent (B-1) with a crosslinking agent (B-4).

Example 5

An amount of 100 g of the copolymer (A-1) produced in Production Example 2 was dissolved in 400 g of toluene to prepare a modified olefin polymer varnish (2). Except for using 49.4 g of the thus obtained modified olefin polymer varnish (2), a composite film was obtained in the same manner as in Example 1.

Comparative Example 1

A composite film was obtained in the same manner as in Example 1, except for replacing the crosslinking agent (B-1) with a crosslinking agent (B-5).

Comparative Example 2

A composite film was obtained in the same manner as in Example 1, except for replacing the crosslinking agent (B-1) with a crosslinking agent (B-6).

Comparative Example 3

A composite film was obtained in the same manner as in Example 1, except for replacing the crosslinking agent (B-1) with a crosslinking agent (B-7).

Comparative Example 4

A composite film was obtained in the same manner as in Example 1, except for replacing the crosslinking agent (B-1) with a crosslinking agent (B-8).

Comparative Example 5

A composite film was obtained in the same manner as in Example 1, except for not using the crosslinking agent (B-1).

Comparative Example 6

An amount of 100 g of the copolymer (A-2) produced in Production Example 4 was dissolved in 400 g of toluene to prepare a modified olefin polymer varnish (3). Except for using 49.4 g of the thus obtained modified olefin polymer varnish (3), a composite film was obtained in the same manner as in Example 1.

Example 6

An amount of 49.4 g of the modified olefin polymer varnish (1) obtained in Example 1, 1.3 g of a solution prepared by dissolving 1 g of the crosslinking agent (B-5) in 9 g of ethyl acetate, and 1 g of a solution prepared by dissolving 0.1 g of a catalyst (C-6) in 19.9 g of ethyl acetate were mixed to prepare an adhesive composition for lamination. Except for using the thus obtained adhesive composition for lamination, a composite film was obtained in the same manner as in Example 1.

Example 7

A composite film was obtained in the same manner as in Example 6, except that the amount of the modified olefin polymer varnish (1) of Preparation Example 1 was changed from 49.4 g to 49.7 g and that 1.3 g of the solution prepared by dissolving 1 g of the crosslinking agent (B-5) in 9 g of ethyl acetate was replaced with 0.7 g of a solution prepared by dissolving 1 g of the crosslinking agent (B-3) in 9 g of ethyl acetate.

Example 8

A composite film was obtained in the same manner as in Example 6, except for replacing the crosslinking agent (B-5) with the crosslinking agent (B-3).

Example 9

A composite film was obtained in the same manner as in Example 6, except that the amount of the modified olefin polymer varnish (1) of Preparation Example 1 was changed from 49.4 g to 45.1 g and that 1.3 g of the solution prepared by dissolving 1 g of the crosslinking agent (B-5) in 9 g of ethyl acetate was replaced with 9.8 g of a solution prepared by dissolving 1 g of the crosslinking agent (B-3) in 9 g of ethyl acetate.

Example 10

A composite film was obtained in the same manner as in Example 6, except for replacing the crosslinking agent (B-5) with the crosslinking agent (B-4).

Example 11

An amount of 100 g of the copolymer (A-1) produced in Production Example 2 was dissolved in 400 g of toluene to prepare a modified olefin polymer varnish (2). Except for using 49.4 g of the thus obtained modified olefin polymer varnish (2), a composite film was obtained in the same manner as in Example 6.

Comparative Example 7

A composite film was obtained in the same manner as in Example 6, except for replacing the catalyst (C-6) with the catalyst (C-1).

Comparative Example 8

A composite film was obtained in the same manner as in Example 6, except for replacing the catalyst (C-6) with the catalyst (C-2)

Comparative Example 9

A composite film was obtained in the same manner as in Example 6, except for replacing the catalyst (C-6) with the catalyst (C-3)

Comparative Example 10

A composite film was obtained in the same manner as in Example 6, except for replacing the catalyst (C-6) with the catalyst (C-4)

Comparative Example 11

A composite film was obtained in the same manner as in Example 6, except for replacing the catalyst (C-6) with the catalyst (C-5).

Comparative Example 12

A composite film was obtained in the same manner as in Example 6, except for replacing the crosslinking agent (B-5) with the crosslinking agent (B-6) and replacing the catalyst (C-6) with the catalyst (C-1).

Comparative Example 13

A composite film was obtained in the same manner as in Example 6, except for changing the amount of the modified olefin polymer varnish (1) of Preparation Example 1 from 49.4 g to 50 g and not using the epoxy compound (B-5).

Comparative Example 14

An amount of 100 g of the copolymer (A-2) produced in Production Example 4 was dissolved in 400 g of toluene to prepare a modified olefin polymer varnish (3). Except for using 49.4 g of the thus obtained modified olefin polymer varnish (3), a composite film was obtained in the same manner as in Example 6.

5. Evaluation

[Bond Strength (Strength in Normal State)]

Each of the composite films of Examples 1 to 11 and Comparative Examples 1 to 14 was cut to prepare a test specimen with a length of 60 mm and a width of 15 mm, and this test specimen was subjected to a 180° peel test using a universal tensile testing machine at a cross-head speed of 50 mm/min to measure the initial bond strength for the composite film. The results are shown in Tables 3 and 4. Based on the measured values of the initial bond strength, evaluation was made according to the following criteria.

(Evaluation Criteria)
Excellent: 11 N/15 mm or more
Good: 8 N/15 mm or more and less than 11 N/15 mm
Average: 6 N/15 mm or more and less than 8 N/15 mm
Poor: Less than 6 N/15 mm

TABLE 3

| | | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Composition | Thermoplastic resin (A) | (A-1) | (A-1) | (A-1) | (A-1) | (A-1) | (A-1) | (A-1) | (A-1) | (A-1) | (A-1) | (A-2) |
| | wt % | 78.9 | 78.9 | 78.9 | 78.9 | 98.7 | 78.9 | 78.9 | 78.9 | 78.9 | 80 | 98.7 |
| | Epoxy compound (B) | (B-1) | (B-2) | (B-3) | (B-4) | (B-1) | (B-5) | (B-6) | (B-7) | (B-8) | — | (B-1) |
| | wt % | 1.3 | 1.3 | 1.3 | 1.3 | 1.3 | 1.3 | 1.3 | 1.3 | 1.3 | 0 | 1.3 |
| | Hydrocarbon synthetic oil (D) | (D-1) | (D-1) | (D-1) | (D-1) | — | (D-1) | (D-1) | (D-1) | (D-1) | (D-1) | — |
| | wt % | 19.8 | 19.8 | 19.8 | 19.8 | 0 | 19.8 | 19.8 | 19.8 | 19.8 | 20 | 0 |
| Al foil/CPP Adhesion after aging at 60° C. for 3 days | Initial bond strength (N/15 mm) | 10.9 | 8.5 | 8.8 | 9.3 | 8 | 5.7 | 7.6 | 5.8 | 4.5 | 3.3 | 6 |
| | Evaluation | Good | Good | Good | Good | Good | Poor | Average | Poor | Poor | Poor | Average |

TABLE 4

| | | Example 6 | Example 7 | Example 8 | Example 9 | Example 10 | Example 11 | Comparative Example 7 | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|---|---|---|---|---|---|
| Composition | Thermoplastic resin (A) | (A-1) | (A-1) | (A-1) | (A-1) | (A-1) | (A-1) | (A-1) | (A-1) | (A-1) | (A-1) | (A-1) | (A-1) | (A-1) | (A-2) |
| | wt % | 78.9 | 79.4 | 78.9 | 72.2 | 78.9 | 98.7 | 78.9 | 78.9 | 78.9 | 78.9 | 78.9 | 78.9 | 80 | 98.7 |
| | Epoxy compound (B) | (B-5) | (B-3) | (B-3) | (B-3) | (B-4) | (B-5) | (B-5) | (B-5) | (B-5) | (B-5) | (B-5) | (B-6) | — | (B-5) |
| | wt % | 1.3 | 0.7 | 1.3 | 9.8 | 1.3 | 1.3 | 1.3 | 1.3 | 1.3 | 1.3 | 1.3 | 1.3 | 0 | 1.3 |
| | Catalyst (C) | (C-6) | (C-6) | (C-6) | (C-6) | (C-6) | (C-6) | (C-1) | (C-2) | (C-3) | (C-4) | (C-5) | (C-1) | (C-6) | (C-6) |
| | ppm | 500 | 500 | 500 | 500 | 500 | 500 | 500 | 500 | 500 | 500 | 500 | 500 | 500 | 500 |
| | Hydrocarbon synthetic oil (D) | (D-1) | (D-1) | (D-1) | (D-1) | (D-1) | — | (D-1) | (D-1) | (D-1) | (D-1) | (D-1) | (D-1) | (D-1) | — |
| | wt % | 19.8 | 19.8 | 19.8 | 18 | 19.8 | 0 | 19.8 | 19.8 | 19.8 | 19.8 | 19.8 | 19.8 | 20 | 0 |
| Al foil/CPP Adhesion after aging at 60° C. for 3 days | Initial bond strength (N/15 mm) | 9.8 | 11.3 | 10.6 | 11.2 | 11.9 | 8.5 | 3.6 | 5.4 | 4.7 | 5.5 | 5 | 4.3 | 6 | 6 |
| | Evaluation | Good | Excellent | Good | Excellent | Excellent | Good | Poor | Poor | Poor | Poor | Poor | Poor | Average | Average |

The values listed in Tables 3 and 4 for the resin (A), compound (B), and oil (D) each represent the content of the corresponding component with respect to 100 mass % of the non-volatile components (resin (A)+compound (B)+oil (D)) in the composition. The values listed in Table 4 for the catalyst (C) each represent the content of the catalyst (C) with respect to 100 mass % of the non-volatile components (resin (A)+compound (B)+oil (D)) in the composition.

It is believed that results similar to those shown above can be obtained also when an oxazoline compound is used instead of the epoxy compound (B) in the compositions as obtained in Examples 6 to 11.

The invention claimed is:

1. A composition comprising:
   a modified olefin polymer (A) that is a modified olefin polymer, the modified olefin polymer being a polymer (a) of a $C_2$ to $C_2$ α-olefin modified by a monomer (b) having a functional group reactive with an epoxy group or an oxazoline group;
   a crosslinking agent (B) comprising at least one of an epoxy compound and an oxazoline compound; and
   a catalyst (C) having a pKa of 11 or more, the modified olefin polymer (A) satisfying the following requirements (i) and (ii):
   Requirement (i): the polymer (a) comprises a structural unit derived from a $C_4$ to $C_{20}$ α-olefin, and
   Requirement (ii): a heat of fusion of the modified olefin polymer (A), as measured according to JIS K7122, is 0 to 50 J/g.

2. The composition according to claim 1, comprising a hydrocarbon synthetic oil (D) having a kinematic viscosity at 40° C. of 30 to 500,000 cSt.

3. The composition according to claim 1, wherein the polymer (a) comprises a structural unit derived from propylene.

4. The composition according to claim 3, wherein a content of the structural unit derived from propylene is 40 to 95 mol % with respect to 100 mol % of a structural unit derived from a $C_2$ to $C_{20}$ α-olefin.

5. The composition according to claim 3, wherein in the polymer (a), all structural units other than the structural unit derived from propylene are structural units derived from a $C_4$ to $C_{20}$ α-olefin.

6. The composition according to claim 1, wherein the $C_4$ to $C_{20}$ α-olefin comprises 1-butene.

7. The composition according to claim 1, wherein a content of a structural unit derived from the monomer (b) is 0.1 to 15 mass % with respect to 100 mass % of the modified olefin polymer (A).

8. The composition according to claim 1, wherein the functional group is a carboxyl group or an acid anhydride group.

9. The composition according to claim 1, wherein the crosslinking agent (B) is at least one selected from a bisphenol A liquid epoxy resin, an alicyclic epoxy compound, and a trimethylolpropane polyglycidyl ether.

10. A laminate comprising a substrate and an adhesive layer composed of a cured product of the composition according to claim 1.

11. A packaging material comprising a laminate comprising an internal layer, an adhesive layer, and a substrate in this order,
   the adhesive layer being a layer composed of a cured product of the composition according to claim 1.

12. A battery case packaging material, comprising a laminate comprising an internal layer, an inner adhesive layer, a substrate, an outer adhesive layer, and an external layer in this order,
   the inner adhesive layer being a layer composed of a cured product of the composition according to claim 1.

13. A battery comprising the battery case packaging material according to claim 12 and an electrolyte solution packaged by the battery case packaging material, the internal layer of the battery case packaging material being at least partly in contact with the electrolyte solution.

14. A composition comprising:
   a modified olefin polymer (A) that is a modified olefin polymer resulting from modification of a polymer (a) of a $C_2$ to $C_{20}$ α-olefin by a monomer (b1) having a functional group reactive with an epoxy group; and at least one crosslinking agent (B1) selected from a bisphenol A liquid epoxy resin, an alicyclic epoxy compound, and a trimethylolpropane polyglycidyl ether, the modified olefin polymer (A) satisfying the following requirements (i) and (ii):

Requirement (i): the polymer (a) comprises a structural unit derived from a $C_4$ to $C_{20}$ α-olefin, and Requirement (ii): a heat of fusion of the polymer (A), as measured according to JIS K7122, is 0 to 50 J/g.

15. The composition according to claim 14, comprising a hydrocarbon synthetic oil (D) having a kinematic viscosity at 40° C. of 30 to 500,000 cSt.

16. A laminate comprising a substrate and an adhesive layer composed of a cured product of the composition according to claim 14.

* * * * *